US008886763B2

(12) United States Patent
Bose et al.

(10) Patent No.: US 8,886,763 B2
(45) Date of Patent: Nov. 11, 2014

(54) METHOD AND APPARATUS FOR PROVIDING INTEROPERABILITY BETWEEN DEVICES

(75) Inventors: Raja Bose, Mountain View, CA (US); Jorg Brakensiek, Mountain View, CA (US); Keun-Young Park, Mountain View, CA (US)

(73) Assignee: Nokia Corporatin, Espoo (FI)

( * ) Notice: Subject to any disclaimer, the term of this patent is extended or adjusted under 35 U.S.C. 154(b) by 502 days.

(21) Appl. No.: 12/771,891

(22) Filed: Apr. 30, 2010

(65) Prior Publication Data

US 2011/0270600 A1     Nov. 3, 2011

(51) Int. Cl.
  *G06F 15/16*  (2006.01)
  *G06F 9/54*   (2006.01)
  *G06F 9/44*   (2006.01)

(52) U.S. Cl.
  CPC ............. G06F 9/542 (2013.01); G06F 9/4445 (2013.01)
  USPC ........... 709/219; 709/201; 709/202; 709/203

(58) Field of Classification Search
  None
  See application file for complete search history.

(56) References Cited

U.S. PATENT DOCUMENTS

| 5,113,517 | A  | * | 5/1992  | Beard et al. ........................ 703/23 |
| 5,969,835 | A  | * | 10/1999 | Kamieniecki et al. .......... 398/33 |
| 6,618,425 | B1 | * | 9/2003  | Carlesi et al. ................... 372/109 |
| 2004/0068574 | A1 | * | 4/2004  | Costa Requena et al. ..... 709/230 |
| 2004/0068584 | A1 | * | 4/2004  | Costa-Requena et al. ..... 709/246 |
| 2005/0086344 | A1 | * | 4/2005  | Suesserman ................... 709/227 |
| 2006/0077120 | A1 | * | 4/2006  | Domi et al. ...................... 345/2.3 |
| 2007/0008302 | A1 |   | 1/2007  | Uchida et al. |
| 2007/0229465 | A1 |   | 10/2007 | Sakai et al. |
| 2009/0161027 | A1 | * | 6/2009  | Hardacker et al. ............ 348/734 |
| 2009/0209205 | A1 | * | 8/2009  | Kramer et al. ................ 455/41.3 |
| 2011/0084900 | A1 |   | 4/2011  | Jacobsen et al. |

FOREIGN PATENT DOCUMENTS

| GB | 2 439 753 A | 1/2008 |
| WO | WO 2009/120984 A1 | 10/2009 |

OTHER PUBLICATIONS

International Search Report and Written Opinion for Application No. PCT/FI2011/050326 dated Aug. 23, 2011.

* cited by examiner

*Primary Examiner* — Umar Cheema
(74) *Attorney, Agent, or Firm* — Alston & Bird LLP (57) ABSTRACT

An apparatus, method, and computer program product are provided for enabling interoperability between devices, such as a mobile terminal and some other remote device or remote environment. The apparatus may include at least one processor and at least one memory including computer program code. The at least one memory and the computer program code may be configured, with the processor, to cause the apparatus to maintain a terminal session between a server device and a client device in which the client device emulates at least a portion of a display presented at the server device; receive an indication of a user input received at the client device identifying a function to be performed at the server device; determine a corresponding input to elicit the identified function; and cause the identified function to be performed at the server device.

14 Claims, 5 Drawing Sheets

METHOD AND APPARATUS FOR PROVIDING INTEROPERABILITY BETWEEN DEVICES

TECHNOLOGICAL FIELD

Embodiments of the present invention relate generally to inter-device communications technology and, more particularly, relate to an apparatus and method for providing interoperability between devices, such as non-touch devices and touch remote environments.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. In this regard, wireless communication has become increasingly popular in recent years due, at least in part, to reductions in size and cost along with improvements in battery life and computing capacity of mobile electronic devices. As such, mobile electronic devices have become more capable, easier to use, and cheaper to obtain. Due to the now ubiquitous nature of mobile electronic devices, people of all ages and education levels are utilizing mobile terminals to communicate with other individuals or contacts, receive services and/or share information, media and other content. Moreover, for many individuals, mobile electronic devices such as portable digital assistants (PDAs), pagers, mobile televisions, mobile telephones, gaming devices, laptop computers, cameras, video recorders, audio/video players, radios, and global positioning system (GPS) devices become heavily relied upon for work, play, entertainment, socialization, and other functions. Thus, many people are very connected to their respective mobile electronic devices.

Given the personal connection many people have to their mobile electronic devices, and their ability and penchant for having such devices with them, people often desire to access the capabilities of their mobile electronic devices even when the mobile electronic devices are not particularly accessible, or when it may not necessarily be safe to interact with the user interface of the mobile electronic terminal.

Accordingly, it may be desirable to provide an improved mechanism by which a mobile electronic device or mobile terminal may interface with and be operable through other devices.

BRIEF SUMMARY OF EXAMPLE EMBODIMENTS

A method and apparatus are therefore provided that enable interoperability between devices, such as a mobile terminal of the user and some other remote device or remote environment (e.g., a vehicle head unit). In this regard, for example, the mobile terminal of a user and the remote environment may exchange information such that at least a portion of the content displayed at the mobile terminal is also displayed at the remote environment, and a user's interaction with the user interface of the remote environment is translated into corresponding input to the mobile terminal. In this way, for example, if the remote environment is a touch remote environment and the mobile terminal is a non-touch device, touch events received at the remote environment user interface may be passed on to the mobile terminal and may cause corresponding key press inputs to be simulated at the mobile terminal to perform desired functions.

In one example embodiment, a method of providing interoperability between devices is provided. The method may include maintaining a terminal session between a server device and a client device in which the client device emulates at least a portion of a display presented at the server device; receiving an indication of a user input received at the client device identifying a function to be performed at the server device; determining a corresponding input usable by the server device based on the indication to elicit the identified function; and causing the identified function to be performed at the server device.

In another example embodiment, a computer program product for providing interoperability between devices is provided. The computer program product may include at least one computer-readable storage medium having computer-executable program code instructions stored therein. The computer-executable program code instructions may include program code instructions for maintaining a terminal session between a server device and a client device in which the client device emulates at least a portion of a display presented at the server device; receiving an indication of a user input received at the client device identifying a function to be performed at the server device; determining a corresponding input usable by the server device based on the indication to elicit the identified function; and causing the identified function to be performed at the server device.

In another example embodiment, an apparatus for providing interoperability between devices is provided. The apparatus may include at least one processor and at least one memory including computer program code. The at least one memory and the computer program code may be configured, with the processor, to cause the apparatus to at least maintain a terminal session between a server device and a client device in which the client device emulates at least a portion of a display presented at the server device; receive an indication of a user input received at the client device identifying a function to be performed at the server device; determine a corresponding input usable by the server device based on the indication to elicit the identified function; and cause the identified function to be performed at the server device.

In a further embodiment, an apparatus is provided for providing interoperability between devices that includes means for maintaining a terminal session between a server device and a client device in which the client device emulates at least a portion of a display presented at the server device. The apparatus may also include means for receiving an indication of a user input received at the client device identifying a function to be performed at the server device. The apparatus may also include means for determining a corresponding input usable by the server device based on the indication to elicit the identified function and means for causing a user interface state of the server device to be updated based on the actuation of the input mechanism of the client device. For example, the user interface state may be updated by causing the identified function to be performed at the server device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device), can be differentiated from a "computer-readable transmission medium," which refers to an electromagnetic signal.

As indicated above, mobile terminals are becoming very common and very personal to their respective users. As such, users prefer to have access to their mobile terminals at all times. When operating an automobile, for example, a user may still want to have access to his mobile terminal, for example to receive and transmit calls, listen to messages, and/or access the Internet, among other things.

In some cases, the user interface options offered by a server device, such as the mobile terminal, are different from the interfaces offered by certain remote environments, such as a head unit in an automobile. The remote environment, or client device, for example, may include a touch screen that allows a user to select different functions by touching certain designated areas of the screen. The server device, however, may be a non-touch device that includes buttons, knobs, dials, or other features for allowing a user to select different functions of the device. Accordingly, a user may prefer to engage the touch interface of the client device as opposed to the non-touch interface of the server device in certain situations. For example, where the server device is a mobile terminal and the remote environment is a vehicle head unit, the user may find it easier (and safer) to interact with the touch screen of the head unit, both to elicit operations of the vehicle (such as turning on the radio) and operations of the mobile terminal (such as making a phone call). As such, the touch remote environment should be able to communicate with the non-touch device to enable control functions for the non-touch device to be provided based on inputs received at the user interface of the touch remote environment.

Some embodiments of the present invention may provide a mechanism by which the features and capabilities of the server device are projected onto the client device, such that interaction with the user interface of the client device invokes the functionality of the server device. For example, the server device, such as a cellular telephone or PDA, may be integrated into the remote environment of the client device, such as a vehicle head unit, meeting room audio-visual system, or living room sound system, by virtue of the physical presence of the server device in proximity to the client device (e.g., the user carries the cellular phone into the vehicle). As a result, the features and capabilities of the server device may appear as if they are inherent capabilities of the client device itself.

Figure 1:
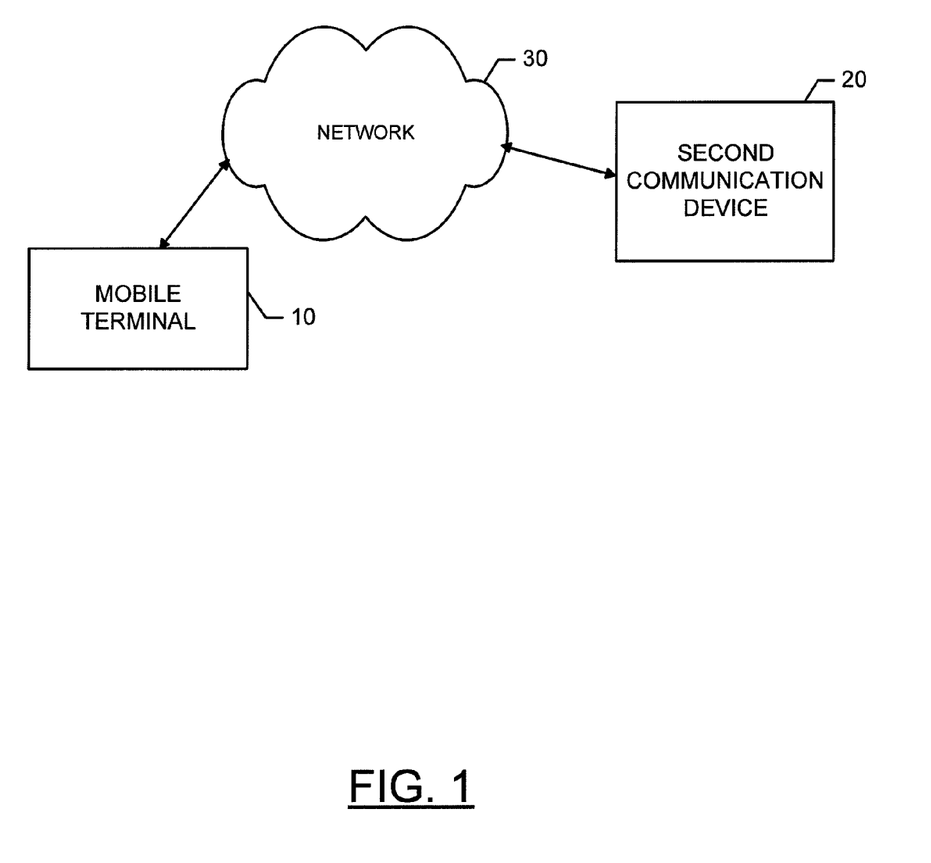
FIG. 1 illustrates one example of a communication system according to an example embodiment of the present invention.

FIG. 1 illustrates a generic system diagram in which a first communication device such as a mobile terminal 10, which may benefit from embodiments of the present invention, is shown in an example communication environment. As shown in FIG. 1, an embodiment of a system in accordance with an example embodiment of the present invention may include a first communication device (e.g., mobile terminal 10) and a second communication device 20 capable of communication with each other. In an example embodiment, the mobile terminal 10 and the second communication device 20 may be in communication with each other via a network 30. In some cases, embodiments of the present invention may further include one or more network devices with which the mobile terminal 10 and/or the second communication device 20 may communicate to provide, request, and/or receive information.

It should be noted that although FIG. 1 shows a communication environment that may support client/server application execution, in some embodiments, the mobile terminal 10 and/or the second communication device 20 may employ embodiments of the present invention without any network communication, but instead via a direct communication link between the mobile terminal 10 and the second communication device 20. As such, for example, applications executed locally at the mobile terminal 10 and served to the second communication device 20 via a direct wired or wireless link may also benefit from embodiments of the present invention. However, it should be noted that communication techniques such as those described herein can be used not only in embedded devices, but in desktops and servers as well.

The network 30, if employed, may include a collection of various different nodes, devices, or functions that may be in communication with each other via corresponding wired and/or wireless interfaces. As such, the illustration of FIG. 1 should be understood to be an example of a broad view of certain elements of the system and not an all inclusive or detailed view of the system or the network 30. One or more communication terminals such as the mobile terminal 10 and the second communication device 20 may be in communication with each other via the network 30 or via device to device (D2D) communication and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the mobile terminal 10 and/or the second communication device 20 via the network 30. By directly or indirectly connecting the mobile terminal 10 and/or the second communication device 20 and other devices to the network 30 or to each other, the mobile terminal 10 and/or the second communication device 20 may be enabled to communicate with the other devices or each other, for example, according to numerous communication protocols including Hypertext Transfer Protocol (HTTP) and/or the like, to thereby carry out various communication or other functions of the mobile terminal 10 and the second communication device 20, respectively.

Furthermore, although not specifically shown in FIG. 1, the mobile terminal 10 and the second communication device 20 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques, and/or the like. As such, the mobile terminal 10 and the second communication device 20 may be enabled to communicate with the network 30 and each other by any of numerous different access mechanisms. For example, mobile access mechanisms such as wideband code division multiple access (W-CDMA), CDMA2000, global system for mobile communications (GSM), general packet radio service (GPRS), and/or the like may be supported, as well as wireless access mechanisms such as WLAN, WiMAX, and/or the like and fixed access mechanisms such as digital subscriber line (DSL), cable modems, Ethernet, and/or the like.

In example embodiments, the first communication device (e.g., the mobile terminal 10) may be a mobile communication device such as, for example, a PDA, wireless telephone, mobile computing device, camera, video recorder, audio/video player, positioning device (e.g., a GPS device), game device, television device, radio device, or various other like devices or combinations thereof. The second communication device 20 may also be a mobile device such as those listed above or other mobile or embedded devices, but could also be a fixed communication device in some instances. For example, the second communication device 20 could be an in-car navigation system, a vehicle head unit, a vehicle entertainment system, a meeting room audio-visual system, a living room entertainment system, or any of a number of other remote environments with which the mobile terminal 10 may communicate.

In an example embodiment, the network 30 may provide for virtual network computing (VNC) operation between the mobile terminal 10 and the second communication device 20. As such, for example, the mobile terminal 10 may serve as a VNC server configured to provide content originally executed or accessed by the mobile terminal 10 to the second communication device 20 acting as a VNC client (or vice versa). A VNC protocol such as RFB (remote frame buffer) or another protocol for enabling remote access to a graphical user interface may be utilized to provide communication between the mobile terminal 10 and the second communication device 20. Moreover, according to one example, the second communication device 20 may be a vehicle entertainment system (e.g., one or more speakers and one or more displays mounted in a head rest, from the ceiling, from the dashboard, or from any other portion of a vehicle such as an automobile).

Figure 2:
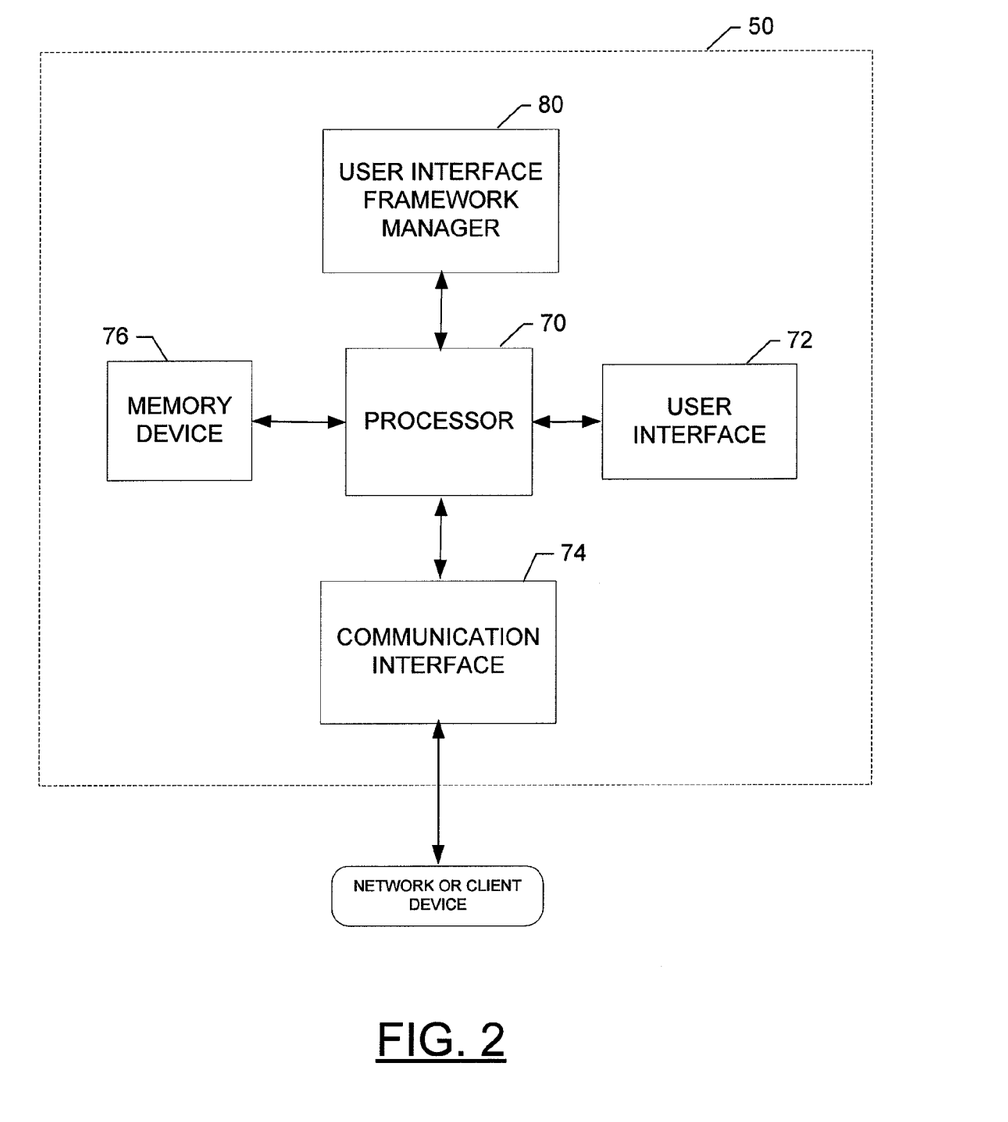
FIG. 2 illustrates a schematic block diagram of an apparatus for providing interoperability between devices according to an example embodiment of the present invention.

In an example embodiment, the mobile terminal 10 may be configured to include or otherwise employ an apparatus according to an example embodiment of the present invention. FIG. 2 illustrates a schematic block diagram of an apparatus for providing interoperability between devices according to an example embodiment of the present invention. An example embodiment of the invention will now be described with reference to FIG. 2, in which certain elements of an apparatus 50 for providing interoperability between touch and non-touch devices are displayed. The apparatus 50 of FIG. 2 may be employed, for example, on a communication device (e.g., the mobile terminal 10 and/or the second communication device 20) or a variety of other devices, such as, for example, any of the devices listed above when such devices are acting as a server device. However, it should be noted that the components, devices, or elements described below may not be mandatory and thus some may be omitted in certain embodiments. Additionally, some embodiments may include further components, devices or elements beyond those shown and described herein. Furthermore, it should be noted that the terms "server device" and "client device" are simply used to describe respective roles that devices may play in connection with communication with each other. As such, a server device is not necessarily a dedicated server, but may be any device such as a mobile terminal that acts as a server relative to another device (e.g., a remote environment) receiving services from the server device. As such, the other device (e.g., the remote environment) may therefore be acting as a client device.

Referring now to FIG. 2, the apparatus 50 may include or otherwise be in communication with a processor 70, a user interface 72, a communication interface 74, and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., the mobile terminal 10 or the second communication device 20) adapted for employing embodiments of the present invention by further configuration of the processor 70 by instructions for performing the algorithms and/or operations described herein. By executing the instructions or programming provided thereto or associated with the configuration of the processor 70, the processor 70 may cause corresponding functionality to be performed. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB), or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the mobile terminal 10 or the second communication device 20), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an exemplary embodiment, the processor 70 may be embodied as, include or otherwise control a user interface framework manager 80. As such, in some embodiments, the processor 70 may be said to cause, direct, or control the execution or occurrence of the various functions attributed to the user interface framework manager 80 as described herein. The user interface framework manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the user interface framework manager 80 as described herein. Thus, in examples in which software is employed, a device or circuitry (e.g., the processor 70 in one example) executing the software forms the structure associated with such means.

In an example embodiment, the user interface framework manager 80 may be configured to interface with a client device (e.g., via the communication interface 74) to establish and maintain a terminal session between a server device hosting the user interface framework manager 80 and the client device in which the client device emulates at least a portion of a display presented at the server device. As such, the user interface framework manager 80 may, for example, facilitate a remote frame buffer copying process to copy frames from the content rendered at the server device (e.g., the mobile terminal 10) in a first frame buffer over to a second frame buffer at the client device (e.g., second communication device 20) for rendering at the client device. The rendering at the client device may therefore appear as an emulation of at least selected portions of the content rendered at the server device.

In an example embodiment, the user interface framework manager 80 may be further configured to receive an indication of a user input that was received, for example, at the client device and transmitted from the client device to the server device (e.g., the mobile terminal 10). The indication of the user input may indentify a function to be performed at the server device.

Figure 3:
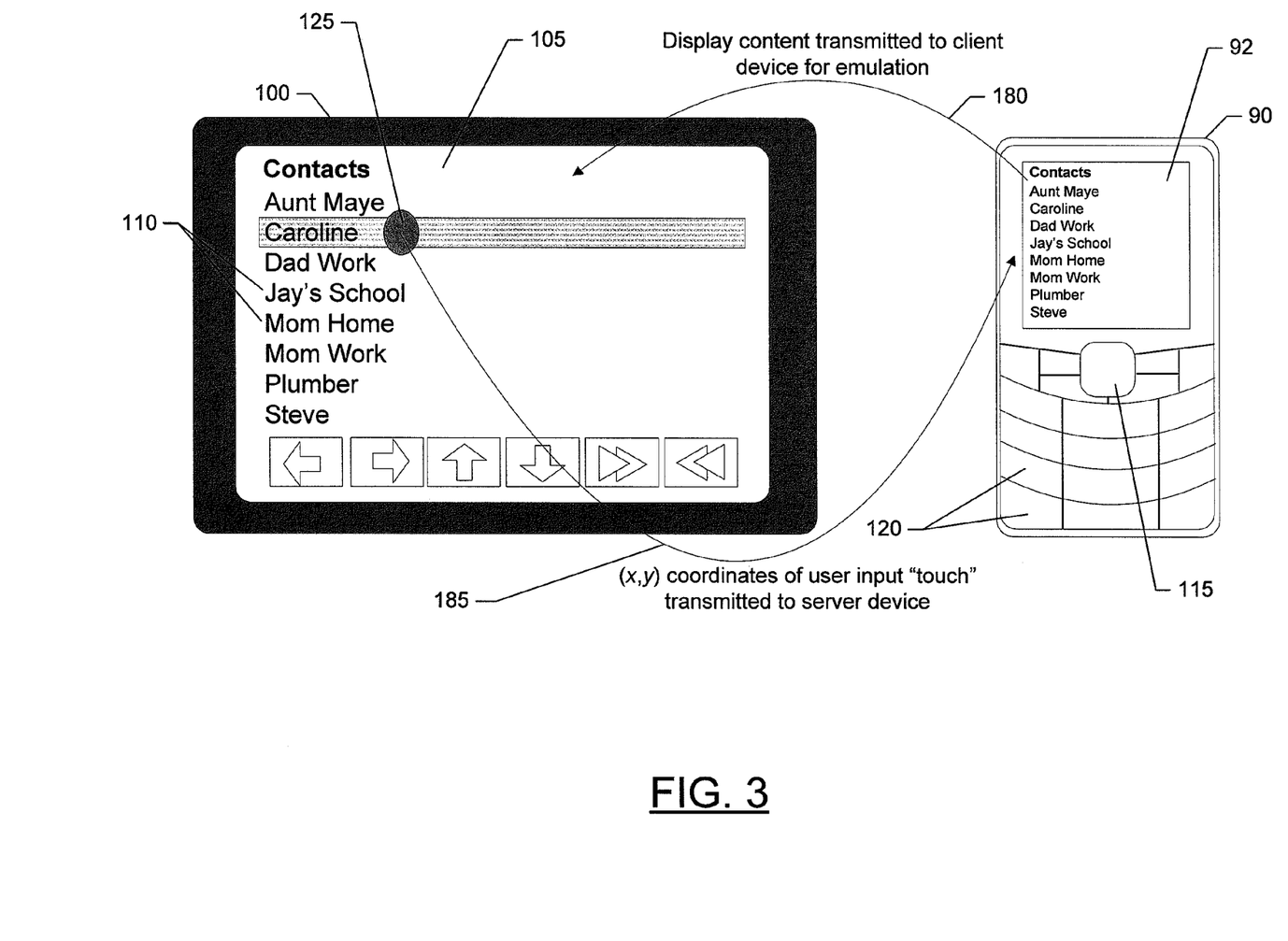
FIG. 3 illustrates a schematic diagram showing display content at a server device and a client device that are interoperable in accordance with an example embodiment of the present invention.

FIG. 3 illustrates a block diagram of a client device and a server device involved in a terminal session to illustrate an example embodiment. As shown in FIG. 3, a server device 90 may be the mobile terminal 10, which may include a display 92 as a portion of the user interface of the device 90. In some embodiments, the display 92 may be a touch screen display, but a touch screen display is not necessarily used in other embodiments, and in the depicted embodiment the display 92 is a non-touch screen display. The client device 100 of this example is a remote environment including a remote terminal display 105. The remote terminal display 105 may be a touch screen display in some cases, but not necessarily all.

Referring to FIG. 3, for example, in cases where the server device 90 (e.g., the mobile terminal 10) is a non-touch device, such as a cellular phone with keys or buttons and a non-touch screen display 92, and the client device 100 is a touch remote environment, such as a vehicle head unit with a touch screen display 105, the touch screen display of the client device may present the same or similar content or a portion of the content displayed on the non-touch screen display of the server device. In an example embodiment, the server device 90 may provide display content for emulation to the client device 100 as indicated at operation 180. Thus, as shown, the touch screen display 105 may present a "Contacts" screen that lists a number of contacts 110 that are stored on the cellular phone, for example.

If the user were interacting directly with the server device (in this example, the cellular phone), the user may, for example, use the navigation key 115 to scroll up or down, changing the "focus" of the server device from one contact to the next. In this regard, the term "focus" is used to refer to the particular user interface element to which a subsequent selection or action will apply. In some cases, to provide clarity to the user, a focus user interface element may be highlighted, outlined, or otherwise visually differentiated from other user interface elements. When the focus is on a particular user interface element (such as the contact "Caroline" in the figure), it is then possible to select the focused element to produce a desired output. In the depicted example, because focus is on "Caroline," depressing the center of the navigation key 115 in this case may select the contact entry for "Caroline" and may cause details for this contact (such as the contact's phone number) to be displayed. Alternatively, pressing a "Call" button may cause the mobile terminal 10 to dial the phone number associated with the focused contact.

Thus, in addition to providing focus to particular user interface elements, depressing certain keys of the non-touch device (in this example, the cellular phone) also elicit particular functions, or "key press" events. In other words, to cause the non-touch device to achieve a desired output through interaction directly with the non-touch device, the user typically has to use the keys 115, 120, buttons, dials, or other user input elements to switch the focus to the desired user interface element, then use the keys to effect a key press event that results in the desired output.

In embodiments of the present invention, the user is able to elicit functions of the server device (e.g., the mobile terminal 10) through interaction with the touch remote environment of the client device (e.g., the touch screen display 105). For example, the user may provide input to the client device by touching the touch screen 105 to indicate the desired function to be performed by the server device (e.g., shift focus and/or produce a requested output). Thus, considering the example described above and shown in FIG. 3, the user may touch the touch screen 105 at a location 125 corresponding to the selection of the contact "Caroline" to bring up the contact details for this entry. The (x,y) coordinates of this "touch event" may then be transmitted from the client device to the server device, as indicated at operation 185, to be translated into the appropriate focus and key press events for accessing and displaying the selected contact's details from the data stored in the server device.

In this regard, a touch event may be a single touch or "tap" of the touch user interface (e.g., touch screen 105). In some cases, though, a touch event may be a multi-touch gesture, such as a swipe or a two-finger touch motion. For example, a swipe may be used to scroll up or down in a list of contacts (e.g., to view contacts that are not visible on the screen). As another example, a two-finger zoom gesture (where two fingers are placed on the user interface in a single location then moved apart, or vice versa) may be used to zoom in on certain displayed content. In cases where the touch event is a multi-touch gesture, the touch event may be translated into a sequence of one or more corresponding key press events, as described below.

Thus, the user interface framework manager 80 shown in FIG. 2 may be further configured to determine a corresponding input usable by the server device based on the indication to elicit the identified function and to cause the identified function to be performed at the server device. In other words, for example, the (x,y) coordinates resulting from the touch event at location 125 of the client device and transmitted to the server device may be mapped to a corresponding focus and key press event so that the corresponding user input may be simulated at the server device and cause the desired function to be performed.

Figure 4:
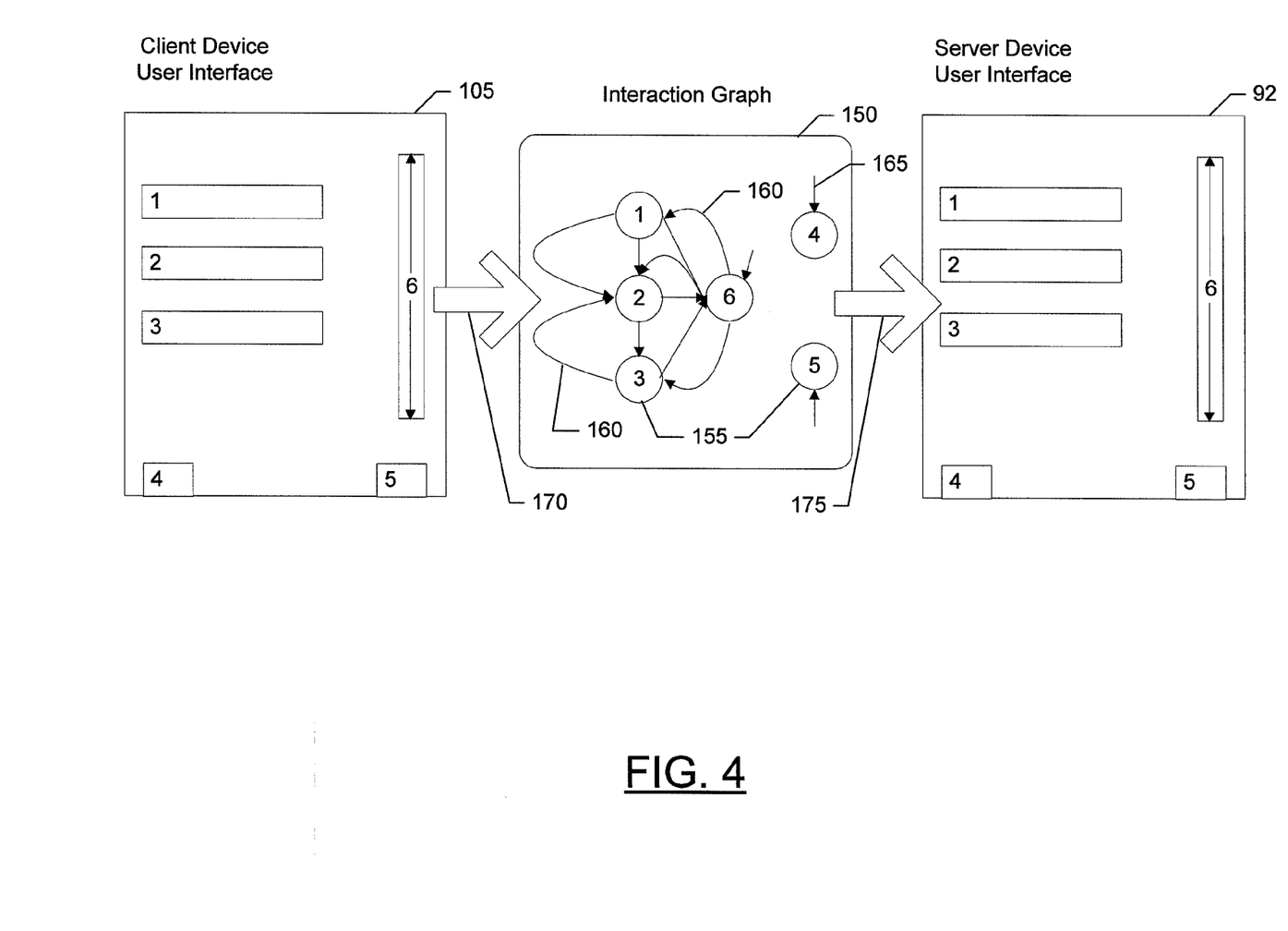
FIG. 4 illustrates a schematic diagram showing an interaction graph relating input received at the client device to the corresponding input at the server device in accordance with an example embodiment of the present invention.

In some embodiments, the user interface framework manager 80 is configured to create an interaction graph 150, shown in FIG. 4, that maps the relationship between and among the various user interface elements displayed at the client device and/or the server device. In general, graphical user interfaces (GUIs) typically have a tree-based hierarchy that can be traversed to provide a model of the relationship between the different displayed user interface elements. A user interface framework usually consists of a fixed set of user interface elements, so for each of these user interface elements, the user interface framework manager 80 has information regarding the behavior of the particular element in terms of how to shift focus to the particular element and how to elicit a particular output associated with the particular element. Thus, the interaction graph 150 is a model of the behavior of the displayed user interface elements and the relationships between and among the different elements.

Referring to FIG. 4, each user interface element displayed on the client device display 105, and in this case also displayed on the server device display 92, is represented as a node 155 on the interaction graph 150. Thus, for example, displayed entries 1, 2, and 3, soft keys 4 and 5, and scroll bar 6 are represented as nodes 155 correspondingly numbered 1-6 on the interaction graph 150. The arrows 160 pointing from one node 155 to another represent "edges," which reflect the focus relationship between the nodes. In other words, if the user desired to change focus from user interface element 1 to user interface element 3, the interaction graph 150 in this case indicates that the focus must first be shifted from node 1 to node 2, then from node 2 to node 3. Said differently, focus cannot be shifted directly from node 1 to node 3 as there is no edge 160 directly linking nodes 1 and 3 in the depicted example. This corresponds to the fact that, on the non-touch device (e.g., the mobile terminal), the navigation button would have to be depressed twice to move from user interface element 1 to highlighting user interface element 3 (e.g., depressing the "down" key twice).

Similarly, the depicted interaction graph 150 indicates that to shift focus from user interface element 2 to user interface element 6, the "right" key would be depressed on the server device user interface one time by the user. Thus, the interaction graph 150 indicates which key press is associated with the change in focus by showing the direction and orientation of the edges 160.

For some of the depicted user interface elements, such as user interface elements 4, 5, and 6, at least one of the associated edges 160 linking to that node 155 does not originate from another node (referred to as a "floating" edge). In these cases, the floating edges 165 indicate that one key press is associated with that node to directly focus on that particular user interface element, regardless of where the current focus is. In other words, because, for example, user interface elements 4 and 5 are soft keys, depressing the soft keys on the server device would directly focus on the depressed soft key, without the need to navigate from the previously focused (e.g., highlighted) user interface element. A touch event received with respect to a user interface element that is already in focus is translated into an appropriate action to be performed on the focused user interface element. For example, the appropriate action may be translated into an "OK" or "Select" key press event, indicating that the desired output is to be produced, or it may be translated into an "Up" or "Down" key press event, depending on the functionality of the particular user interface element (e.g., a scroll bar).

Furthermore, for certain user interface elements, such as certain types of buttons (but not necessarily only soft buttons), a touch event may be translated into a sequence of key press events that combine both focus and action. For example, to select a displayed button on the user interface of non-touch device, it may first be necessary to focus on that button by using navigation keys and then pressing "OK" to produce the desired action. In the case of a touch-based interaction, however, the button would be focused and "pressed" with a single touch event by the user. Thus, in this example, the single touch event would be translated into one or more corresponding focus key press events and output/action key press events as part of a single sequence of touch events.

The interaction graph 150, in addition to representing the relationship between the nodes 155 in terms of how to shift focus between the nodes based on the default configuration of the non-touch device, may also reflect saved associations for each user interface element. For the scroll bar 6, for example, the corresponding node shows a saved association of the upper portion of the node 155 with the "up" key, and a saved association of the lower portion of the node with the "down" key.

Thus, an interaction graph 150 may be thought of as a state diagram illustrating the input commands that are possible using the hardware controls of the server device. The user interface framework manager 80 is configured to generate an interaction graph 150, in some cases, each time new user options are displayed. Therefore, no modification of the underlying software of the client device or server device is required, and, as described below, the conversion of touch user input received at the client device to physical input usable by the server device can be done substantially instantaneously, or "on the fly."

More specifically, referring to FIG. 4, an indication 170 of the user input (e.g., the (x,y) coordinates of the touch event 125) received at the server device may be used in conjunction with the interaction graph 150 to determine the corresponding input 175 required to elicit the identified function of the server device. Thus, the user interface framework manager 80 may access the interaction graph 150, which may be stored on the user interface framework manager or in the memory device 76, and, based on the indication 170 received, map the indication to the corresponding input that can be used at the server device to elicit the desired function. In other words, using the interaction graph 150, the user interface framework manager 80, acting, for example, in conjunction with the processor 70, can simulate a key press event or a series of key press events to cause the desired function to be performed at the server device.

To illustrate and by way of example, the user interface framework manager 80 may use the (x,y) coordinates indicating a touch event at a location 125 (FIG. 3) to determine which user interface element is being selected by the user by comparing the coordinates of the touch event to a set of stored coordinates referencing the position of each displayed user interface element. In the depicted example, the (x,y) coordinates reflect a touch event at the contact "Caroline," which is displayed proximate the touch location 125. If the user interface element ("Caroline," in this example) was already in focus, the current touch event would be translated by the user interface framework manager 80 as an "OK" or "Select" key press event, for example, such that the server device would retrieve the contact details and transmit them for display on the touch screen of the client device as a result of the touch event. If, in this same example, the user interface element "Caroline" was not in focus, then the touch event would be translated by the user interface framework manager 80 as a key press or sequence of key presses defined by the path of edges 160 provided in the interaction graph 150 (shown in FIG. 4) from the user interface element (shown as a node 155 in the interaction graph) previously in focus to the currently touched user interface element. Alternatively, if the touched user interface element is shown as having a "floating" edge 165 (i.e., no source node 155), then the touch event would be translated by the user interface framework manager 80 as the key press associated with that edge.

Said differently, the user interface framework manager 80 is configured to translate or map each touch event into one or more key press events that serve as inputs for performing a desired function at the server device by (1) knowing which node 155 is in focus prior to the touch event; (2) receiving an indication of the touch event from the client device, for example in the form of an (x,y) coordinate reflecting the location of the touch event; (3) using the indication to determine which user interface element was touched by the user at the client device; and (4) referring to the generated interaction graph 150 to determine the key press or sequence of key presses required to serve as a corresponding input to the server device for shifting focus from the previous node to the touched node or, if the previous node and the touched node are the same, for eliciting the desired output at the server device. In other words, the function identified by the touch event may either be a shift of focus or the request for a desired output. Either way, the user interface framework manager 80 is able to determine the corresponding input usable by the server device to elicit the identified function at the server device, for example, with reference to the interaction graph 150.

Figure 5:
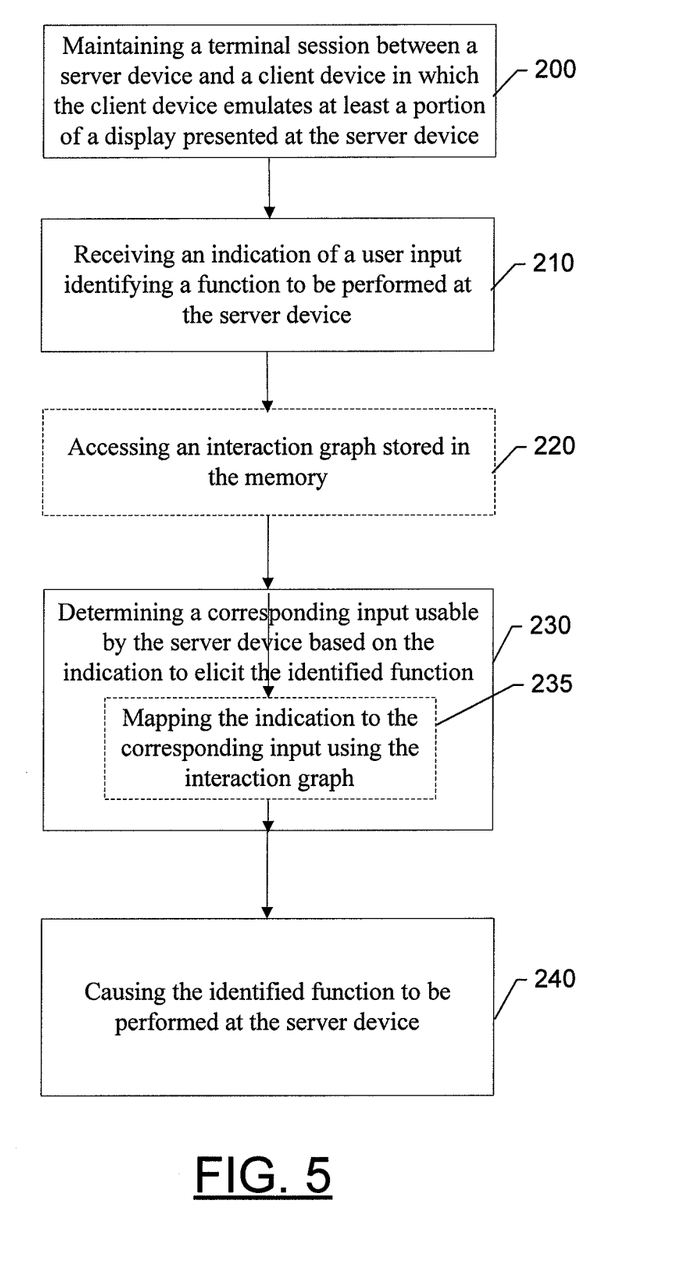
FIG. 5 illustrates a flowchart of a method of providing interoperability between devices in accordance with an example embodiment of the present invention.

FIG. 5 is a flowchart of a system, method, and program product according to example embodiments of the invention. It will be understood that each block of the flowchart, and combinations of blocks in the flowchart, may be implemented by various means, such as hardware, firmware, processor, circuitry, and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method for providing interoperability between devices, such as between non-touch devices and touch remote environments, as shown in FIG. 5, includes maintaining a terminal session between a server device and a client device in which the client device emulates at least a portion of a display presented at the server device at operation 200. Maintaining the terminal session may include the monitoring of a communication channel established between the server device and the client device or any other action associated with facilitating continuity of the connection therebetween. In some cases, maintaining the terminal session may include copying frame buffer contents from the server device to the client device. The method may further include receiving an indication of a user input identifying a function to be performed at the server device at operation 210 and determining (e.g., via the user interface framework manager 80) a corresponding input usable by the server device based on the indication to elicit the identified function at operation 230. As described above, the identified function may include shifting focus to a desired user interface element and/or requesting a desired output. The method may also include causing the identified function to be performed at the server device at operation 240.

In some embodiments, certain ones of the operations above may be modified or further amplified as described below. Furthermore, in some embodiments, additional optional operations may be included, some examples of which are shown in dashed lines in FIG. 5. Modifications, additions, or amplifications to the operations above may be performed in any order and in any combination. In this regard, for example, the method may further include accessing an interaction graph stored in memory (such as the memory device 76 shown in FIG. 2) at operation 220. Thus, in some embodiments, determining a corresponding input may further include mapping the received indication to the corresponding input using the interaction graph at operation 235. As a result, one or more key press events that can be used as the corresponding input to the server device may be simulated, for example, using the interaction graph.

In an example embodiment, the indication received at operation 210 may be the result of a touch event at the client device, such as when the client device is a touch remote environment including a touch screen. Thus, when the server device is a non-touch device, the indication of the touch event, which may, for example, be (x,y) coordinates, may be translated into one or more key press events that serve as input to the non-touch server device, as described above. For example, the interaction graph may be used to determine which key press or sequence of key presses at the server device corresponds to the touch event that occurred at the client device.

In an example embodiment, an apparatus for performing the method of FIG. 5 above may comprise a processor (e.g., the processor 70) configured to perform some or each of the operations (200-240) described above. The processor may, for example, be configured to perform the operations (200-240) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-240 may comprise, for example, the processor 70, the user interface framework manager 80, and/or a device or circuit for executing instructions or executing an algorithm for processing information as described above.

Although the description and associated figures provide examples of a user interface framework manager residing on a server device and receiving, at the server device, the indication of a user input from the client device, it is contemplated that in some instances a user interface framework manager may reside on the client device and, thus, the indication may be received at the client device. In the same way, an interaction graph may be generated at the client device based on information received from the server device, and the corresponding input for use by the server device may be determined at the client device, for example, using the interaction graph. Thus, in this case, the corresponding input may be transmitted from the client device to the server device to elicit a desired function at the server device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:

maintain a terminal session between a server device and a client device in which the client device emulates at least a portion of a display presented at the server device;

receive an indication of a user input received at the client device identifying a function to be performed at the server device, wherein the user input received at the client device is a touch input;

determine a corresponding input usable by the server device based on the indication to elicit the identified function by mapping the indication received at the client device to the corresponding input using an interaction graph, wherein the corresponding input is configured to simulate a key press event at the server device; and cause the identified function to be performed at the server device, wherein the interaction graph represents a relationship between nodes representing user interface elements of the server device and describes a sequence of focus shifting steps for shifting focus between two nodes based on a configuration of the server device.

2. The apparatus of claim 1, wherein the memory and computer program code are configured to, with the processor, cause the apparatus to simulate a sequence of key press events at the server device.

3. The apparatus of claim 1, wherein the interaction graph is stored in the memory, and wherein the memory and computer program code are configured to, with the processor, cause the apparatus to access the interaction graph stored in the memory.

4. The apparatus of claim 1, wherein the server device is a mobile terminal.

5. A method comprising:

maintaining a terminal session between a server device and a client device in which the client device emulates at least a portion of a display presented at the server device;

receiving an indication of an input received at the client device identifying a function to be performed at the server device, wherein the user input received at the client device is a touch input;

determining a corresponding input usable by the server device based on the indication to elicit the identified function by mapping the indication received at the client device to the corresponding input using an interaction graph, wherein the corresponding input is configured to simulate a key press event at the server device; and causing the identified function to be performed at the server device, wherein the interaction graph represents a relationship between nodes representing user interface elements of the server device and describes a sequence of focus shifting steps for shifting focus between two nodes based on a configuration of the server device.

6. The method of claim 5, wherein determining the corresponding input comprises simulating a sequence of key press events at the server device.

7. The method of claim 5, wherein the interaction graph is stored at the server device, and wherein the method further comprising accessing the interaction graph stored at the server device.

8. The method of claim 5, wherein the server device is a mobile terminal.

9. A computer program product comprising at least one non-transitory computer-readable storage medium having computer-executable program code portions stored therein, the computer-executable program code portions comprising program code instructions for:

maintaining a terminal session between a server device and a client device in which the client device emulates at least a portion of a display presented at the server device;

receiving an indication of a user input received at the client device identifying a function to be performed at the server device, wherein the user input received at the client device is a touch input;

determining a corresponding input usable by the server device based on the indication to elicit the identified function by mapping the indication received at the client device to the corresponding input using an interaction graph, wherein the corresponding input is configured to simulate a key press event at the server device; and causing the identified function to be performed at the server device, wherein the interaction graph represents a relationship between nodes representing user interface elements of the server device and describes a sequence of focus shifting steps for shifting focus between two nodes based on a configuration of the server device.

10. The computer program product of claim 9, wherein the interaction graph is stored at the server device, and wherein the computer program product further comprising program code instructions for accessing the interaction graph stored at the server device.

11. The computer program product of claim 9, wherein program code instructions for determining the corresponding input include instructions for simulating a sequence of key press events at the server device.

12. The apparatus of claim 1, wherein the memory and computer program code are further configured to, with the processor, cause the apparatus to generate the interaction graph in response to new user input options of the server device being presented.

13. The method of claim 5 further comprising generating the interaction graph in response to new user input options of the server device being presented.

14. The computer program product of claim 9 further comprising program code instructions for generating the interaction graph in response to new user input options of the server device being presented.

* * * * *

UNITED STATES PATENT AND TRADEMARK OFFICE
CERTIFICATE OF CORRECTION

PATENT NO. : 8,886,763 B2
APPLICATION NO. : 12/771891
DATED : November 11, 2014
INVENTOR(S) : Bose et al.

It is certified that error appears in the above-identified patent and that said Letters Patent is hereby corrected as shown below:

Title page,
Item (73) Assignee: "Nokia Corporatin" should read --Nokia Corporation--.

Signed and Sealed this
Thirtieth Day of June, 2015

Michelle K. Lee
*Director of the United States Patent and Trademark Office*